3,660,450
REACTION PRODUCTS OF SILICON MONOXIDE AND AROMATIC COMPOUNDS SUCH AS BENZENE AND METHODS OF MAKING THE SAME
Peter L. Timms, Bristol, England, assignor to Owens-Illinois, Inc.
No Drawing. Filed Mar. 3, 1970, Ser. No. 16,268
Int. Cl. C07f 7/08, 7/18
U.S. Cl. 260—448.2 D      17 Claims

ABSTRACT OF THE DISCLOSURE

An organo silicon polymer is prepared by the reaction of silicon monoxide and an aromatic compound such as benzene to provide a polymer that is useful as a lubricant, as an ingredient for a coating composition and as a filler for plastic compositions.

---

The present invention relates to reaction products of silicon monoxide and an aromatic compound such as benzene and to methods for preparing the reaction products.

It is an object of the present invention to provide a new reaction product by reacting gaseous silicon monoxide in a vacuum with an aromatic compound such as benzene to form a mixture and condensing the mixture of gaseous silicon monoxide and aromatic compounds to provide the organo silicon polymer reaction product.

It is an object of the present invention to provide a reaction product of silicon monoxide and benzene and methods of preparing the same.

These and other objects will be apparent from the specification that follows and the appended claims.

The present invention provides a reaction product of silicon monoxide and an aromatic compound such as benzene generally in a one-step reaction to provide a new organo silicon polymer.

The present invention also provides methods of making an addition product of silicon monoxide and benzene or other aromatic compound reactant such as naphthalene, or anthracene by bringing together gaseous silicon monoxide in a vacuum with the reactant, preferably in the gaseous form, and condensing the gaseous mixture at about −196° C. to about 100° C. to obtain the addition product of silicon monoxide and aromatic compound. The reaction of silicon monoxide with the aromatic compound apparently takes place on the cooled surface of a reaction chamber, the temperature being about −196° to 100° C. In general, the polymeric condensate is a solid, infusible material that is either insoluble in organic solvents or soluble in solvents such as benzene, acetone, dioxane, dimethyl formamide, etc. The polymer has a high surface area and is hygroscopic. The polymer has good high temperature resistant properties. Thus, in general, the products are solid and infusible (they decompose very slowly and gradually at higher temperatures such as those above about 400° C.).

Infrared-spectroscopy and hydrolytical decomposition data indicate that a 1,4 addition of SiO to the benzene ring occurs along the lines of the following equation:

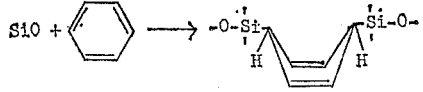

In general, no further addition of SiO to the two remaining double bonds in the 1,4-cyclohexadiene is noticed. The polymerization of SiO itself competes with the 1,4-addition to benzene. The transfer from a mono-coordinated silicon in the monomeric SiO to a tetra-coordinated silicon in the organo silicon polymer and the instability of a Si=O double bond are responsible for a strong cross-linking. The reaction product usually contains Si—O—Si bonds as well as sometimes Si—Si bridges. Hence, the polymer of the present invention can contain Si—Si bridges in addition to the Si—O—Si bridges.

Silicon monoxide can be obtained commercially and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pats. No. 2,882,177 and 2,823,979, which are also incorporated by reference.

The benzene or other aromatic compound is generally used in excess amount on a molar basis compared to the silicon monoxide used. Generally, the molar ratio of the aromatic compound to silicon monoxide is in the range of as low as about 1 or 1.5:1 to as high as about 100 or 150:1 and preferably about 20:1 to 50.1.

Although benzene is a highly preferred aromatic compound for use in the present invention, other aromatic compounds such as ring substituted benzene including toluene, xylene, ethyl benzene, trimethyl benzene, propyl benzene, cymene and durene as well as compounds having more than one ring structure such as biphenyl, naphthalene, anthracene, phenanthsene and other higher condensed hydrocarbons can be used. Aromatic nitro-compounds such as nitrobenzene and nitronaphthalene, aromatic ethers such as diphenylether and alkyl aromatic ethers such as methyl-phenylether and aromatic halogen compounds such as chlorobenzene, chlorotoluene, bromobenzene, bromotoluene and benzyl chloride can be used. In some cases there may be a competing reaction between the aromatic ring structure and groups substituting on the ring with silicon monoxide.

The following examples are intended to illustrate the present invention and not to limit the same in any way.

EXAMPLE 1

Gaseous silicon monoxide and gaseous benzene were brought together and mixed within a large chamber. Portions of the walls of the chamber were cooled by liquid nitrogen. The gaseous mixture was formed within the chamber at a pressure of 1 to $5 \times 10^{-5}$ torr using a large excess of benzene. The gaseous mixture was condensed on the cooled walls of the chamber to form a reaction product. The reaction product was a polymer formed from the reaction of silicon monoxide and benzene. It was insoluble in organic solvents and infusible.

EXAMPLE 2

Gaseous benzene was reacted with gaseous silicon monoxide at a pressure of 1 to $5 \times 10^{-5}$ torr by co-condensing both gases onto the walls of a rotatable cylinder which serves as a quenching trap. The reaction of silicon monoxide with benzene apparently takes place on the cooled surface of the cylinder.

The silicon monoxide was prepared by heating commercially available SiO to about 1200° to 1300° C. at the high vacuum indicated and quenching the same with a large excess of aromatic reactant in which the ratio of benzene to silicon monoxide was about 50:1 on a molar basis. Upon warming to room temperature, the excess of unreacted benzene was removed from the reaction product. The reaction product was a yellowish solid with a molecular formula of $C_6H_6(SiO)_4$. The product is insoluble in inert solvents and infusible. The yield based on the silicon monoxide condensed onto the cold trap is 100%. The resulting reaction product was used as a stopcock grease, as a filler in organic compositions such as organopolysiloxane compositions, polyvinyl chloride compositions and in high temperature laminates with glass fibers.

In the above examples, other aromatic compounds such as naphthalene and anthracene previously described as suitable can be substituted in whole or part for the benzene starting materials and substantially equivalent results obtained. In general, the resultant polymers were infusible and mostly insoluble in organic solvents. The soluble polymers were useful as coating solutions to coat glass and plastics, wood and other materials. They are also usable for films and self-supporting sheets. The insoluble products are useful as stop-cock greases and fillers in plastic compositions such as organopolysiloxane molding compositions.

What is claimed is:

1. A reaction product of silicon monoxide and an aromatic compound containing at least one benzene nucleus, the compound having no triple bonds and having no active hydrogen atoms, the silicon monoxide and aromatic compound being mixed at a pressure of about $1 \times 10^{-6}$ to $1 \times 10^{-2}$ torr to form a mixture that is condensed at about $-196°$ to $100°$ C. to provide the reaction product.

2. An organo silicon polymer having a molecular chain with (—Si—O—) units prepared by the reaction of silicon monoxide and an aromatic compound having a benzene ring, the compound having no triple bonds and having no active hydrogen atoms, the silicon monoxide and aromatic compound being mixed at a pressure of about $1 \times 10^{-6}$ to $1 \times 10^{-2}$ torr to form a mixture that is condensed at about $-196°$ to $100°$ C. to provide the reaction product.

3. A method of preparing an organo silicon polymer comprising reacting one mole of silicon monoxide with about 1.5 to 150 moles of an aromatic compound having at least one benzene ring, the compound having no triple bonds and having no active hydrogen atoms, the silicon monoxide and aromatic compound being mixed at a pressure of about $1 \times 10^{-6}$ to $1 \times 10^{-2}$ torr to form a mixture that is condensed at about $-196°$ to $100°$ C. to provide the reaction product.

4. A method of preparing an organo silicon polymer comprising the steps of mixing one mole of gaseous silicon monoxide and about 20 to 50 moles of an aromatic compound having at least one benzene nucleus and having no triple bonds and having no active hydrogen atoms in a vacuum at a pressure of about $1 \times 10^{-5}$ to $5 \times 10^{-5}$ torr to form a mixture, condensing the mixture at about $-196°$ to $-70°$ C. to provide the organo silicon polymer that is a reaction product of silicon monoxide and the benzene nucleus of the aromatic compound.

5. A reaction product as defined in claim 1 in which the aromatic compound is benzene.

6. A method as defined in claim 3 in which the aromatic compound is benzene.

7. A method as defined in claim 3 in which the aromatic compound is naphthalene.

8. A method for preparing an organo silicon polymer comprising the steps of mixing one mole of gaseous silicon monoxide at a pressure of about $1 \times 10^{-6}$ to $1 \times 10^{-2}$ torr with about 1.5 to 150 moles of a gaseous aromatic compound having at least one benzene nucleus and having no triple bonds and having no active hydrogen atoms to form a mixture, and condensing the mixture at a temperature of about $-196°$ to $100°$ C. to provide the organo silicon polymer.

9. A method as defined in claim 8 in which the molar ratio of aromatic compound to silicon monoxide is about 20:1 to 50:1.

10. A method of preparing an organo silicon polymer comprising the steps of heating solid silicon monoxide to about $1200°$ to $1300°$ C. in a vacuum to form gaseous silicon monoxide, mixing gaseous silicon monoxide and gaseous benzene in a vacuum to form a mixture, and solidifying the mixture at a temperature of about $-196°$ to $+100°$ C. to obtain the organo silicon polymer having a molecular chain containing (—O—Si—O—) units.

11. A method as defined in claim 10 in which the vacuum has a pressure of about $1 \times 10^{-6}$ to $1 \times 10^{-2}$ torr and the solidifying of the mixture is at a temperature of about $-196°$ to $-70°$ C.

12. A method as defined in claim 8 in which the pressure is at about 1 to $5 \times 10^{-5}$ torr.

13. A reaction product of one mole of silicon monoxide and about 1.5 to 150 moles of an aromatic compound containing at least one benzene nucleus of the group consisting of benzene, naphthalene, anthracene, biphenyl, phenanthrene, toluene, xylene, ethyl benzene, trimethyl benzene, propyl benzene, cymene, durene, nitrobenzene, nitronaphthalene, diphenylether, methyl-phenylether, chloro benzene, chlorotoluene, bromobenzene, bromotoluene and benzyl chloride, the silicon monoxide and aromatic compound being mixed at a pressure of about $1 \times 10^{-6}$ to $1 \times 10^{-2}$ torr to form a mixture that is condensed at about $-196°$ to $100°$ C. to provide the reaction product.

14. A reaction product as defined in claim 13 in which the aromatic compound is naphthalene.

15. A reaction product as defined in claim 13 in which the aromatic compound is benzene.

16. A reaction product of silicon monoxide and benzene.

17. A reaction product of silicon monoxide and naphthalene.

No references cited.

TOBIAS E. LEVOW, Primary Examiner

P. F. SHAVER, Assistant Examiner

U.S. Cl. X.R.

117—124 F, 147; 252—49.6; 260—37 SB, 46.5 R, 448.2 E, 448.2 R, 448.8 R